United States Patent
Emami

[19]

[11] Patent Number: 5,822,372
[45] Date of Patent: Oct. 13, 1998

[54] MULTICARRIER SYSTEM USING SUBCHANNEL CHARACTERISTICS TO IMPLEMENT DIFFERENT ERROR RATES WITHIN A DATA STREAM

[75] Inventor: Shahriar Emami, Sunrise, Fla.

[73] Assignee: Motorola, Inc., Schaumburg, Ill.

[21] Appl. No.: 691,252

[22] Filed: Aug. 2, 1996

[51] Int. Cl.[6] .................................................. H04L 27/28
[52] U.S. Cl. ........................................... 375/260; 370/536
[58] Field of Search .................................... 375/260, 261, 375/298; 370/536

[56] References Cited

U.S. PATENT DOCUMENTS

| | | | |
|---|---|---|---|
| 4,630,263 | 12/1986 | Townsend et al. | 370/85 |
| 4,679,227 | 7/1987 | Hughes-Hartogs | 379/93.31 |
| 5,243,629 | 9/1993 | Wei | 375/299 |
| 5,289,501 | 2/1994 | Seshadri et al. | 375/286 |
| 5,307,376 | 4/1994 | Castelain et al. | 375/260 |
| 5,479,447 | 12/1995 | Chow et al. | 375/260 |

*Primary Examiner*—Stephen Chin
*Assistant Examiner*—Jeffrey W. Gluck
*Attorney, Agent, or Firm*—Andrew S. Fuller

[57] ABSTRACT

A multicarrier transmission system (100) supports different desired error rates within a data symbol stream by manipulating subcarrier transmission characteristics for multiple subcarriers. A data symbol stream obtained for transmission is segmented into multiple substreams, and assigned to subcarriers based on error protection requirements (310, 320, 330). The transmission characteristics of the subcarriers are manipulated, according to a selected transmission configuration, to effect the combined error protection requirements (350, 360). Preferably, the subcarriers are modulated by allocating available power based on the relative error protection required for the substreams (360).

13 Claims, 2 Drawing Sheets

MULTICARRIER SYSTEM USING SUBCHANNEL CHARACTERISTICS TO IMPLEMENT DIFFERENT ERROR RATES WITHIN A DATA STREAM

TECHNICAL FIELD

This invention relates in general to multicarrier communication systems, and more particularly, to the provision of error protection for data transmitted using a multicarrier transmission system.

BACKGROUND

Multicarrier modulation has been gaining popularity over single carrier modulation for the transmission of wireless digital signals in a radio communication system. Multicarrier modulation offers increase flexibility over a single carrier modulation by providing opportunities to optimize transmission bandwidth. In a multicarrier modulation scheme, such as multicarrier quadrature amplitude modulation (MCQAM), multiple subcarriers are employed to transmit a particular bit or symbol stream. Typically, the bit stream is divided into multiple parallel bit streams, corresponding in number to the subcarriers. The subcarrier corresponding to each bit stream is modulated by quadrature amplitude modulation (QAM). The modulated subcarriers are then combined, such as by multiplexing, to generate a composite signal. The use of MCQAM reduces the need for system equalization and provides opportunities for enhancing total data throughput, or overall system performance.

In a typical wireless communication, the presence of noise may affect the receipt and processing of a communicated signal. The presence of noise typically depends on the communication environment, which includes factors such as the presence of interfering communications, passive interferers within the communication signal path, and the like. Most sophisticated digital communication systems make some provision to mitigate the effects of noise and other interference on communications. For example, a digital signal may be encoded with error correction information, which information is used to provide some level of error mitigation at the receiver for the digital signal. Error encoding involves the addition of redundancy bits to encoded data in order to provide for error correction at the receiving end of the signal. Different portions of the data stream may be provided with different levels of error protection by using error correction codes with different coding rates.

While the use of error correction codes provides for mitigation of channel induced errors, the error correction codes account for a substantial portion of the transmitted data. Consequently, a reduction in transmission rate or an increase in bandwidth is required for the same effective data rate without error correction. Moreover, additional processing is required for encoding and decoding the error correction codes. Commonly used techniques, such as convolutional encoding and decoding require substantial computation. Generally, the burdens of correction codes are accepted as a necessary price for providing data transmission with acceptable error rates.

It is desirable to provide for different error rates for various portions of a data stream without the disadvantages of adding error correction information to the transmitted data, while providing for a more efficient use of available bandwidth or an increase in data transmission rate. Therefore, a new approach to the transmission of data with varying error rate requirements is needed.

DETAILED DESCRIPTION OF THE PREFERRED EMBODIMENT

The present invention provides for a multicarrier or multiplexing transmission system that uses different transmission characteristics on different subcarriers to implement error protection requirements for a transmitted data stream. In operation, a data stream obtained for transmission is segmented into multiple substreams having different error protection requirements, and assigned to subcarriers based on error protection requirements. The transmission characteristics of the subcarriers are manipulated, according to a selected transmission configuration, to effect the combined error protection requirements. In the preferred embodiment, the subcarriers are modulated by allocating available power based on the relative error protection required for the substreams and on expected channel conditions.

Figure 1:
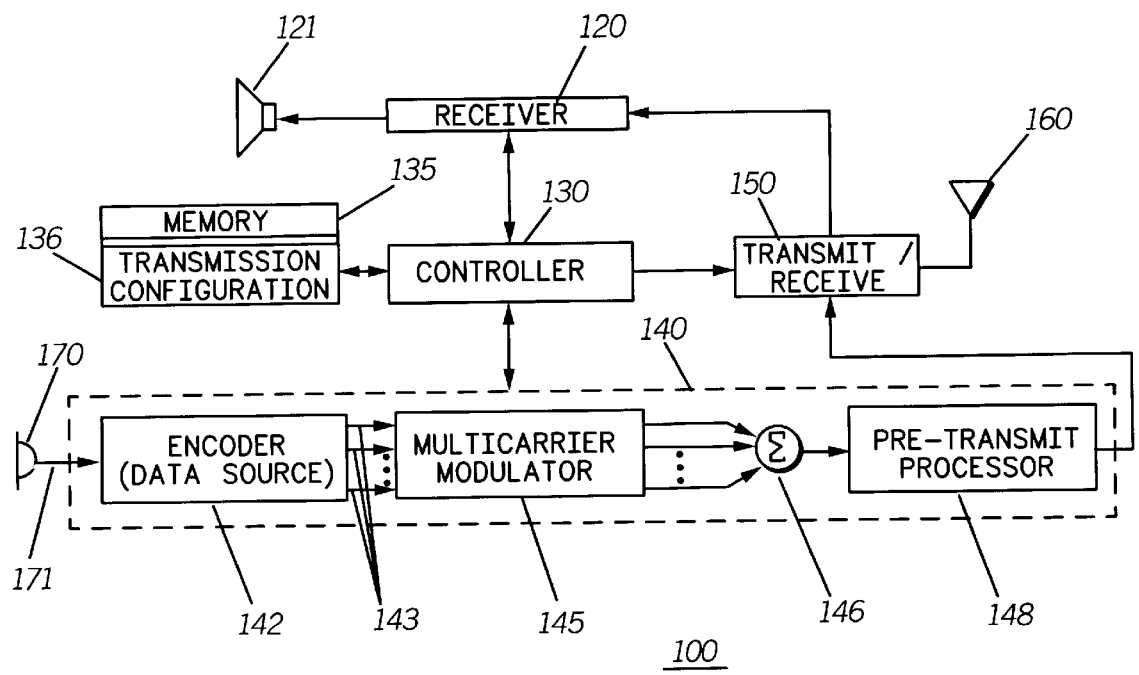
FIG. 1 is a block diagram of a two-way communication device having a multicarrier transmitter section, in accordance with the present invention.

FIG. 1 is a block diagram of a radio communication device 100 that incorporates multicarrier transmission features, in accordance with the present invention. The communication device 100 is a two-way radio transceiver having circuitry for communicating over radio frequency channels in a multicarrier communication system. A multicarrier system as used herein refers to the use of multiple subcarriers in a common transmission medium to simultaneously transmit two or more information signals in such a manner that the information signals may be discretely recovered. The terms "subcarrier" and "subchannel" are used interchangeably herein. In the preferred embodiment, information signals are multiplexed for transmission using a modified version of 16 point Quadrature Amplitude Modulation (16 QAM).

The communication device 100 includes a controller 130 that provides operational control for various functions, including receive and transmit operations. For receive operations, a transmit/receive switch 150 is engaged to selectively couple an antenna 160 to a receiver 120. Signals from the receiver 120 are processed under control of the controller 130 to provide output as necessary through a coupled speaker 121. For transmit operations, the transmit/receive switch 150 is engaged to couple a transmitter 140 to the antenna 160. In a typical transmit operation, audio signals 171 from a microphone 170 is coupled to a speech encoder 142, which functions as a data source to a multicarrier modulator 145. The encoder or data source 142 generates a stream of data symbols or bits 143. The multicarrier modulator 145 generates modulated signals on multiple subcarriers or subchannels, which modulated signals represent the data symbol stream 143. The modulated signals are combined at a combiner 146 and undergo any necessary processing at a pre-transmit processor 148 before being transmitted through the antenna 160 via the transmit/receiver switch 150. The controller 130 provides operational control of the communication device 100 according to instructions and data stored in memory 135. The memory 135 further includes transmission configuration information 136 that is used to operate the multicarrier modulator 145 to implement error protection based on relative error protection requirements for various portions of a data stream.

In a typical application, the radio communication device 100 transmits information signals, such as speech or image data, in digital form. Analysis of such data has shown that some portions of the data are more sensitive than others to channel errors, and thus require better error protection to yield acceptable results at the receiving end. According to the present invention, error protection for portions of data requiring different error rates is accomplished using the multicarrier modulator 145 through appropriate energy or power distribution.

Figure 2:
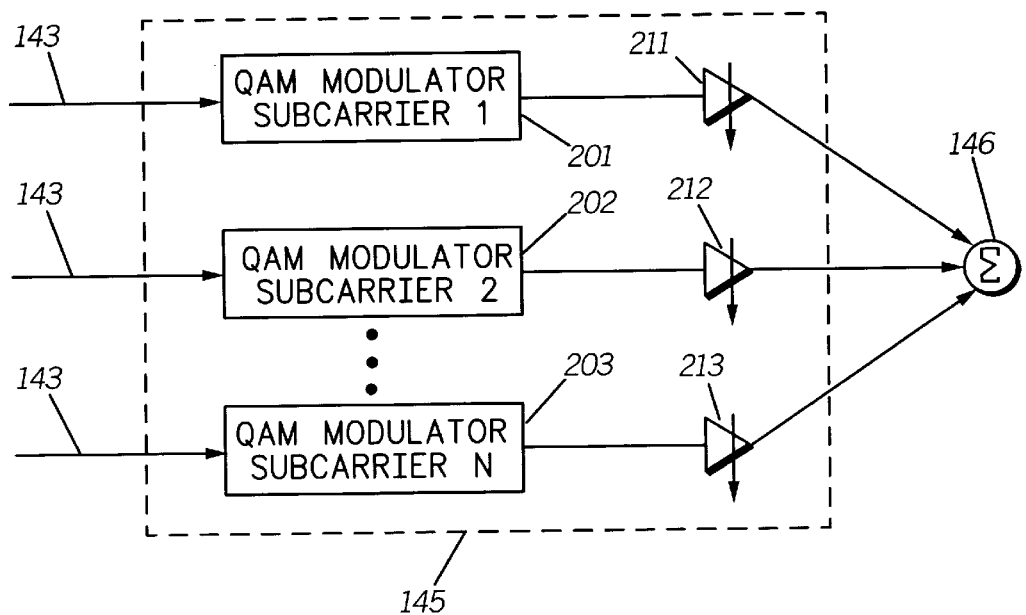
FIG. 2 is a block diagram highlighting features of the multicarrier transmitter section, in accordance with the present invention.

FIG. 2 is a block diagram of the multicarrier modulator 145 highlighting error mitigation based on manipulation of transmission characteristics of subcarriers, in accordance with the present invention. The modulator 145 includes modulators 201, 202, 203, for each subcarrier of the multicarrier transmission system. Although represented as separate modulators 201, 202, 203, for illustration purposes, the implementation of the multicarrier modulator may differ without departure from the concepts embodied by the present invention. Each modulator 201, 202, 203 is coupled to a corresponding gain adjuster 211, 212, 213, to distribute available transmit power to obtain different error rates for the various subcarriers. Preferably, the power distribution is based on an optimized energy ratio that implements an error protection scheme that corresponds to a particular data source or data content, and to the expected communication environment. This modified multicarrier QAM scheme is referred to herein as source matched multicarrier quadrature amplitude modulation (SM-MCQAM).

The multicarrier modulator operates using energy distribution for transmitted data optimized across the subchannels based on data content and expected channel characteristics. In the preferred embodiment, the energy per subchannel is characterized based on the type of channel in which communication is required. For fading channels, the energy per subchannel, $E_i$, can be can be expressed as:

$$E_i = \frac{E}{\sum_{k=1}^{N} P_{b_i}/P_{b_k}} ;$$

where,

N is the number of subchannels;

$E_i$ is the energy allocated to the $i^{th}$ subchannel;

E is the total available energy; and $P_{b_i}/P_{b_k}$ is the ratio of desired error rate, such as bit error rate (BER), in the $i^{th}$ subchannel to desired error rate in the $k^{th}$ subchannel.

The energy distribution characteristics from the above equations are preferably predetermined for a particular data source or data content and known channel conditions, and stored as transmission configuration information. The multicarrier modulator is appropriately configured with the transmission configuration information to reflect data transmission requirements.

Figure 3:
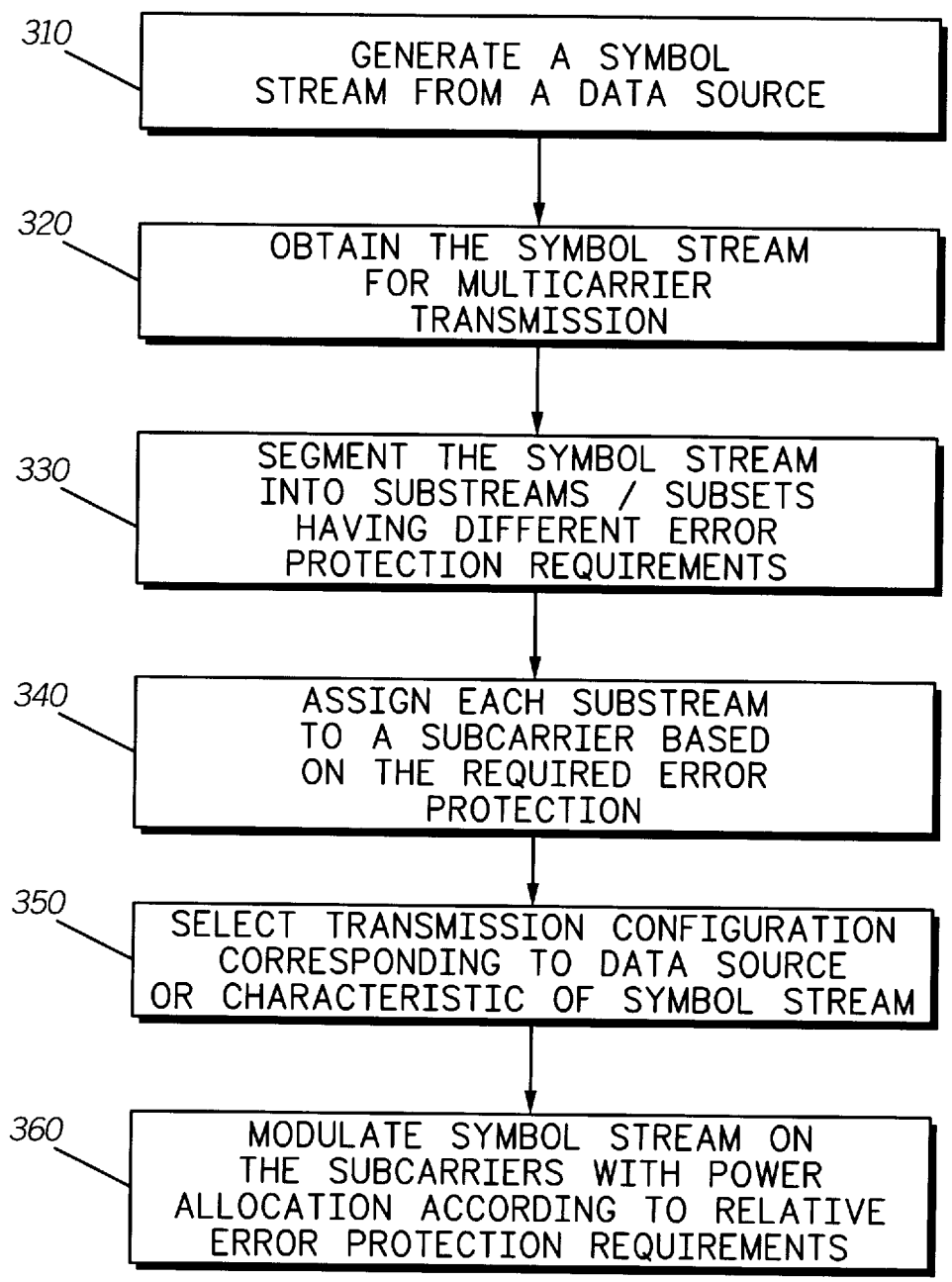
FIG. 3 is a flowchart of procedures for providing different levels of error protection in the multicarrier transmission system, in accordance with the present invention.

FIG. 3 is a flowchart of procedures 300 used by the multicarrier transmission system in transmitting a data symbol stream having portions with different error rates, in accordance with the present invention. A data symbol stream is generated from a data symbol source, such as a speech encoder, image encoder, and the like, step 310. This data symbol stream is obtained for transmission on multiple subchannels by the multicarrier modulator, step 320. The signal stream is segmented into multiple substreams or data sets, according to error protection requirements determined for each data symbol or portion of the data symbol stream, step 330. Preferably, a determination is made that a data symbol stream represents data from a particular data source and the symbols of the symbol stream is partitioned or segmented based on information characterizing the particular data source. The number of substreams correspond to the number of available subchannels. Each segment of the data stream, i.e., each substream, is assigned to one of the subchannels based on required error protection, step 340.

In the preferred embodiment, a data transmission configuration is stored, which configuration relates to the implementation of error protection for data symbols associated with a particular data source. The data transmission configuration includes transmission power allocation per subchannel based on relative error protection requirements for the various segments or substreams of the data symbol stream. This data transmission configuration is selected to govern modulation of the data symbols when the data symbols are determined to originate from the particular data source, step 350. The data transmission configuration is used to manipulate transmission characteristics of the signals on the subchannels to effect the error protection requirements for each substream of symbols. Preferably, the data symbols are modulated on the subcarriers by allocating available power according to relative error protection requirements among the data symbols, step 360.

In summary, data symbols are routed from a data source to multiple modulators based on desired error protection for each data symbol. The data symbols are modulated on subcarriers by allocating available power according to relative error protection requirements the data symbols. Various transmission configurations may be stored for application to different types of data. The power allocation may take additional information into consideration, such as the characteristics of individual subcarriers.

The present invention provides significant benefits over the prior art. By separating and assigning data symbols to subchannels based on desired error rates, and by deliberately manipulating transmission characteristics on the subchannels, different error rates are provided without the need for encoded redundancy information. Thus, the transmission bandwidth and processing needed to handle redundancy symbols are eliminated, and a more efficient use of communication resources promoted. Hence, improved performance can be achieved in terms of maximizing data throughput or increasing signal quality as determined by target symbol error rate.

What is claimed is:

1. In a multicarrier transmission system, a method comprising the steps of:

obtaining a symbol stream for transmission on a plurality of subchannels;

segmenting the symbol stream into a plurality of substreams having different error protection requirements, the plurality of substreams corresponding in number to the plurality of subchannels;

optimizing power distribution of available transmit power to obtain different error rates on the plurality of subchannels that corresponds to the different error protection requirements for the plurality of substreams, based on relative error protection requirements of each of the plurality of subchannels; and transmitting the plurality of substreams on the plurality of subchannels, according to the optimized power distribution to collectively implement the error protection requirements of the plurality of substreams.

2. The method of claim 1, wherein the step of segmenting the symbol stream comprises the steps of:

determining that the symbol stream represents data from a particular data source; and partitioning the symbol stream based on information characterizing the particular data source.

3. The method of claim 1, wherein the step of transmitting comprises the step of modulating signals on the plurality of subchannels according to a transmit power allocation optimized based on data content and channel conditions.

4. The method of claim 3, wherein the transmit power allocation is optimized for fading channels.

5. The method of claim 4, wherein transmit power is distributed across N subchannels, and has energy, $E_i$, on an $i^{th}$ subchannel such that:

$$E_i = \frac{E}{\sum_{k=1}^{N} P_{b_i}/P_{b_k}} ;$$

where,

E is total available energy; and $P_{b_i}/P_{b_k}$ is a ratio of desired error rate in the $i^{th}$ subchannel to desired error rate in a $k^{th}$ subchannel.

6. In a communication device, a method comprising the steps of:

obtaining data from a data source for transmission on a plurality of subchannels;

selecting a transmission configuration corresponding to the data source, which transmission configuration is based on error protection requirements for the data;

segmenting the data into a plurality of data sets corresponding in number to the plurality of subchannels, according to the transmission configuration;

obtaining a power distribution per subchannel by allocating available transmit power based on an optimized energy ratio among the plurality of subchannels that reflects relative error protection requirements among the plurality of data sets; and modulating the plurality of data sets on the plurality of subchannels according to the power distribution per subchannel obtained based on the transmission configuration.

7. The method of claim 6, wherein the power distribution per subchannel is optimized for fading channels.

8. The method of claim 7, wherein power is distributed across N subchannels, and has energy, $E_i$, on an $i^{th}$ subchannel such that:

$$E_i = \frac{E}{\sum_{k=1}^{N} P_{b_i}/P_{b_k}} ;$$

where,

E is total available energy; and $P_{b_i}/P_{b_k}$ is a ratio of desired error rate in the $i^{th}$ subchannel to desired error rate in a $k^{th}$ subchannel.

9. In a multicarrier transmission system having a plurality of subchannels, a method of providing error protection for transmission of a data stream, the method comprising the steps of:

determining error protection requirements for segments of the data stream;

assigning each segment of the data stream to one of the plurality of subchannels based on required error protection; and transmitting the data stream using the plurality of subchannels using a transmit power distribution across the plurality of subchannels according to an energy ratio optimized based on data content of each segment of the data stream and based on channel characteristics.

10. The method of claim 9, wherein the step of determining error protection requirements comprises the step of obtaining information for a data source, which information characterizes portions of the data stream.

11. The method of claim 9, wherein the step of determining error protection requirements comprises the step of characterizing information content for the data stream.

12. The method of claim 9, wherein the step of transmitting the data stream comprises the steps of:

obtaining a transmission power allocation per subchannel based on relative error protection requirements for the segments of the data stream; and transmitting each data segment on each subchannel according to the transmission power allocation.

13. In a multiplexing transmission system having a plurality of subcarriers, a method of providing error control comprising the steps of:

routing data symbols from a data source to a plurality of modulators based on desired error protection for each of the data symbols;

modulating the data symbols on the plurality of subcarriers by allocating available power according to relative error protection requirements among the data symbols;

storing a data transmission configuration relating to implementing error protection for data symbols associated with a particular data source; and selecting the data transmission configuration to govern modulation of the data symbols, when the data symbols originate from the particular data source.

* * * * *